United States Patent
Moser et al.

(10) Patent No.: US 9,097,896 B2
(45) Date of Patent: Aug. 4, 2015

(54) CORRECTING SPATIAL BEAM DEFORMATION

(75) Inventors: Christophe Moser, Pasadena, CA (US); Frank Havermeyer, Arcadia, CA (US)

(73) Assignee: Ondax, Inc., Monrovia, CA (US)

( * ) Notice: Subject to any disclaimer, the term of this patent is extended or adjusted under 35 U.S.C. 154(b) by 1033 days.

(21) Appl. No.: 13/115,075

(22) Filed: May 24, 2011

(65) Prior Publication Data
US 2011/0216384 A1     Sep. 8, 2011

Related U.S. Application Data

(63) Continuation of application No. 12/460,060, filed on Jul. 13, 2009, now Pat. No. 8,369,017.

(60) Provisional application No. 61/197,458, filed on Oct. 27, 2008.

(51) Int. Cl.
| | |
|---|---|
| *G02B 27/09* | (2006.01) |
| *G02B 5/32* | (2006.01) |
| *G02B 5/18* | (2006.01) |

(52) U.S. Cl.
CPC ........ *G02B 27/0927* (2013.01); *G02B 27/0944* (2013.01); *G02B 5/1823* (2013.01); *G02B 5/32* (2013.01)

(58) Field of Classification Search
CPC ...... G02B 5/18; G02B 5/1809; G02B 5/1819; G02B 5/1828; G02B 5/1861; G02B 5/0927; G02B 5/0944; H01S 3/1053; H01S 3/1055
USPC .......................... 359/333, 558, 566, 569, 572
See application file for complete search history.

(56) References Cited

U.S. PATENT DOCUMENTS

| | | | |
|---|---|---|---|
| 3,588,254 | A | 6/1971 | Rhoades |
| 3,588,738 | A | 6/1971 | Goodwin |
| 3,659,947 | A | 5/1972 | Neumann |
| 3,902,135 | A | 8/1975 | Terada |
| 4,017,144 | A | 4/1977 | Staebler |

(Continued)

FOREIGN PATENT DOCUMENTS

DE     4214014     11/1992

OTHER PUBLICATIONS

Askins, "Fiber Bragg refractors prepared by a single excimer pulse," Opt. Lett., vol. 17(11), pp. 833-835 (1992).

(Continued)

*Primary Examiner* — Eric Bolda
(74) *Attorney, Agent, or Firm* — Carr & Ferrell LLP

(57) ABSTRACT

The invention disclosed here teaches methods and apparatus for altering the temporal and spatial shape of an optical pulse. The methods correct for the spatial beam deformation caused by the intrinsic DC index gradient in a volume holographic chirped reflective grating (VHCRG). The first set of methods involves a mechanical mean of pre-deforming the VHCRG so that the combination of the deflection caused by the DC index gradient is compensated by the mechanical deformation of the VHCRG. The second set of methods involves compensating the angular deflection caused by the DC index gradient by retracing the diffracted beam back onto itself and by re-diffracting from the same VHCRG. Apparatus for temporally stretching, amplifying and temporally compressing light pulses are disclosed that rely on the methods above.

8 Claims, 16 Drawing Sheets

(56) References Cited

U.S. PATENT DOCUMENTS

| | | | |
|---|---|---|---|
| 4,057,408 A | 11/1977 | Pierson | |
| 4,103,254 A | 7/1978 | Chikami | |
| 4,181,515 A | 1/1980 | Dyott | |
| 4,456,328 A | 6/1984 | Arns | |
| 4,794,344 A | 12/1988 | Johnson | |
| 4,807,950 A | 2/1989 | Glenn | |
| 4,824,193 A | 4/1989 | Maeda | |
| 4,834,474 A * | 5/1989 | George et al. | 359/8 |
| 4,942,583 A | 7/1990 | Nazarathy | |
| 5,042,898 A | 8/1991 | Morey | |
| 5,107,365 A | 4/1992 | Ota | |
| 5,115,344 A * | 5/1992 | Jaskie | 359/573 |
| 5,221,957 A | 6/1993 | Jannson | |
| 5,315,417 A | 5/1994 | Moss | |
| 5,335,098 A | 8/1994 | Leyva | |
| 5,388,173 A | 2/1995 | Glenn | |
| 5,432,623 A | 7/1995 | Egan | |
| 5,440,669 A | 8/1995 | Rakuljic | |
| 5,491,570 A | 2/1996 | Rakuljic | |
| 5,499,134 A * | 3/1996 | Galvanauskas et al. | 359/333 |
| 5,517,525 A | 5/1996 | Endo | |
| 5,594,744 A | 1/1997 | Lefevre | |
| 5,625,453 A | 4/1997 | Matsumoto | |
| 5,636,304 A | 6/1997 | Mizrahi | |
| 5,640,256 A | 6/1997 | De Vre | |
| 5,657,121 A | 8/1997 | Nishina | |
| 5,684,611 A | 11/1997 | Rakuljic | |
| 5,691,989 A | 11/1997 | Rakuljic | |
| 5,771,250 A | 6/1998 | Shigehara | |
| 5,796,096 A | 8/1998 | Rakuljic | |
| 5,844,700 A | 12/1998 | Jeganathan | |
| 5,917,648 A | 6/1999 | Harker | |
| 5,943,128 A | 8/1999 | Slater | |
| 5,960,133 A | 9/1999 | Tomlinson | |
| 5,966,391 A | 10/1999 | Zediker | |
| 6,049,554 A | 4/2000 | Lang | |
| 6,100,975 A | 8/2000 | Smith | |
| 6,101,301 A | 8/2000 | Engelberth | |
| 6,139,146 A | 10/2000 | Zhang | |
| 6,147,341 A | 11/2000 | Lemaire | |
| 6,169,829 B1 | 1/2001 | Laming | |
| 6,192,062 B1 | 2/2001 | Sanchez-Rubio | |
| 6,211,976 B1 | 4/2001 | Popovich | |
| 6,221,535 B1 | 4/2001 | Cox | |
| 6,226,084 B1 | 5/2001 | Tormod | |
| 6,249,624 B1 | 6/2001 | Putnam | |
| 6,281,974 B1 | 8/2001 | Scheiner | |
| 6,304,687 B1 | 10/2001 | Inoue | |
| 6,327,283 B1 | 12/2001 | Hung | |
| 6,327,292 B1 | 12/2001 | Sanchez-Rubio | |
| 6,339,609 B2 | 1/2002 | Lefevre | |
| 6,356,684 B1 | 3/2002 | Patterson | |
| 6,363,187 B1 | 3/2002 | Fells | |
| 6,370,310 B1 | 4/2002 | Jin | |
| 6,396,982 B1 | 5/2002 | Lin | |
| 6,414,973 B1 | 7/2002 | Hwu | |
| 6,449,097 B1 | 9/2002 | Zhu | |
| 6,498,872 B2 | 12/2002 | Bouevitch | |
| 6,498,891 B1 | 12/2002 | Montesanto | |
| 6,507,693 B2 | 1/2003 | Maron | |
| 6,512,618 B1 | 1/2003 | Heflinger | |
| 6,568,220 B1 | 5/2003 | Paek | |
| 6,586,141 B1 * | 7/2003 | Efimov et al. | 430/1 |
| 6,587,180 B2 | 7/2003 | Wang | |
| 6,606,152 B2 | 8/2003 | Littau | |
| 6,621,957 B1 | 9/2003 | Sullivan | |
| 6,628,862 B1 | 9/2003 | Yao | |
| 6,670,079 B1 | 12/2003 | Kitamura | |
| 6,673,497 B2 | 1/2004 | Efimov | |
| 6,714,309 B2 | 3/2004 | May | |
| 6,750,996 B2 | 6/2004 | Jagt | |
| 6,768,577 B2 | 7/2004 | Eggleton | |
| 6,788,849 B1 | 9/2004 | Pawluczyk | |
| 6,822,218 B2 | 11/2004 | Helmig et al. | |
| 6,828,262 B2 | 12/2004 | Borrelli | |
| 6,829,067 B2 | 12/2004 | Psaltis | |
| 6,844,946 B2 | 1/2005 | Buse | |
| 6,847,763 B2 | 1/2005 | Eggleton | |
| 6,879,441 B1 | 4/2005 | Mossberg | |
| 6,904,200 B2 | 6/2005 | Wang | |
| 6,934,060 B2 | 8/2005 | Psaltis | |
| 6,987,907 B2 | 1/2006 | Psaltis | |
| 6,992,805 B2 | 1/2006 | Ingwall | |
| 7,002,697 B2 | 2/2006 | Domash | |
| 7,031,573 B2 | 4/2006 | Volodin | |
| 7,081,977 B2 | 7/2006 | Kim | |
| 7,081,978 B2 | 7/2006 | Chen | |
| 7,125,632 B2 | 10/2006 | Volodin | |
| 7,136,206 B2 | 11/2006 | Psaltis | |
| 7,173,950 B2 | 2/2007 | Hand | |
| 7,212,554 B2 | 5/2007 | Zucker | |
| 7,245,369 B2 | 7/2007 | Wang | |
| 7,245,407 B2 | 7/2007 | Komma | |
| 7,248,617 B2 | 7/2007 | Volodin | |
| 7,248,618 B2 | 7/2007 | Volodin | |
| 7,273,683 B2 | 9/2007 | Volodin | |
| 7,298,771 B2 | 11/2007 | Volodin | |
| 7,355,768 B1 | 4/2008 | Billmers | |
| 7,359,046 B1 | 4/2008 | Steckman | |
| 7,359,420 B2 | 4/2008 | Shchegrov | |
| 7,372,565 B1 | 5/2008 | Holden | |
| 7,391,703 B2 | 6/2008 | Volodin | |
| 7,397,837 B2 | 7/2008 | Volodin | |
| 7,424,185 B2 | 9/2008 | Glebov et al. | |
| 7,477,818 B2 | 1/2009 | Volodin | |
| 7,483,190 B2 | 1/2009 | Psaltis | |
| 7,528,385 B2 | 5/2009 | Volodin | |
| 7,542,639 B2 | 6/2009 | Moser | |
| 7,545,844 B2 | 6/2009 | Volodin | |
| 7,548,313 B2 | 6/2009 | Nguyen | |
| 7,570,320 B1 | 8/2009 | Anderson | |
| 7,590,162 B2 | 9/2009 | Volodin | |
| 7,605,911 B2 | 10/2009 | Wieloch | |
| 7,633,985 B2 | 12/2009 | Volodin | |
| 7,636,376 B2 | 12/2009 | Moser | |
| 7,639,718 B1 | 12/2009 | Moser | |
| 7,667,882 B2 | 2/2010 | Adibi | |
| 7,697,589 B2 | 4/2010 | Volodin | |
| 7,719,675 B2 | 5/2010 | Grygier | |
| 7,746,480 B2 | 6/2010 | Ozcan | |
| 7,792,003 B2 | 9/2010 | Volodin | |
| 7,796,673 B2 | 9/2010 | Volodin | |
| 7,817,888 B2 | 10/2010 | Volodin | |
| 7,822,347 B1 | 10/2010 | Brennan, III et al. | |
| 7,830,507 B2 | 11/2010 | Brady et al. | |
| 8,384,992 B2 * | 2/2013 | Moser et al. | 359/337.21 |
| 2001/0050751 A1 | 12/2001 | Banyai | |
| 2002/0015376 A1 | 2/2002 | Liu | |
| 2002/0045104 A1 | 4/2002 | Efimov | |
| 2002/0093701 A1 | 7/2002 | Zhang | |
| 2002/0141063 A1 | 10/2002 | Petrov | |
| 2002/0154315 A1 | 10/2002 | Myrick | |
| 2002/0181035 A1 | 12/2002 | Donoghue | |
| 2003/0007202 A1 | 1/2003 | Moser | |
| 2003/0011833 A1 | 1/2003 | Yankov | |
| 2003/0072336 A1 | 4/2003 | Senapati | |
| 2003/0128370 A1 | 7/2003 | De Lega | |
| 2003/0156607 A1 | 8/2003 | Lipson | |
| 2003/0169787 A1 | 9/2003 | Vurgaftman | |
| 2003/0190121 A1 | 10/2003 | Luo | |
| 2003/0210863 A1 | 11/2003 | Myers | |
| 2003/0231305 A1 | 12/2003 | Zeng | |
| 2004/0021920 A1 | 2/2004 | Psaltis | |
| 2004/0165639 A1 | 8/2004 | Lang | |
| 2004/0191637 A1 | 9/2004 | Steckman | |
| 2004/0253751 A1 | 12/2004 | Salnik | |
| 2004/0258356 A1 | 12/2004 | Brice | |
| 2005/0018743 A1 | 1/2005 | Volodin | |
| 2005/0129072 A1 | 6/2005 | Tayebati | |
| 2005/0206984 A1 | 9/2005 | Kawano | |
| 2005/0226636 A1 | 10/2005 | Hiramatsu | |
| 2005/0248819 A1 | 11/2005 | Hymel | |
| 2005/0248820 A1 | 11/2005 | Moser | |
| 2005/0270607 A1 | 12/2005 | Moser | |

(56) References Cited

U.S. PATENT DOCUMENTS

| | | |
|---|---|---|
| 2006/0029120 A1 | 2/2006 | Mooradian |
| 2006/0098258 A1 | 5/2006 | Chen |
| 2006/0114955 A1 | 6/2006 | Steckman |
| 2006/0156241 A1 | 7/2006 | Psaltis |
| 2006/0251143 A1 | 11/2006 | Volodin |
| 2006/0256830 A1 | 11/2006 | Volodin |
| 2006/0280209 A1 | 12/2006 | Treusch |
| 2007/0047608 A1 | 3/2007 | Volodin |
| 2007/0064304 A1* | 3/2007 | Brennan et al. ............... 359/333 |
| 2007/0160325 A1 | 7/2007 | Son |
| 2010/0027001 A1 | 2/2010 | Moser |
| 2010/0103489 A1 | 4/2010 | Moser |
| 2010/0110429 A1 | 5/2010 | Simoni et al. |
| 2010/0149647 A1 | 6/2010 | Figueroa et al. |
| 2011/0216316 A1 | 9/2011 | Moser et al. |

OTHER PUBLICATIONS

Bochove, E.J. et al. "Theory of Spectral Beam Combining of Fiber Lasers," IEEE J. Quant. Elec., 38:5 (2002).

Burr, Geoffrey et al. "Angle and Space Multiplexed Holographic Storage Using the 90 degree Geometry," Optics Comm. 117 (1995).

Curtis, Kevin et al. "Cross Talk for Angle- and Wavelength-Multiplexed Image Plane Holograms," Optics Letters. vol. 19 (21) (1994).

Daneu, V. et al. "Spectral Beam Combining of a Broad-Stripe Diode Laser Array in an External Cavity," Opt. :ett. 25:6 (2000).

Dos Santos, Paulo et al. "Interference-term Real-time Measurement for Self-stablized Two-wave Mixing in Photorefractive Crystals," Optics Letters, Nov. 1988, vol. 13, No. 11, pp. 1014-1016.

Ford, Joseph et al. "Wavelength Add-Drop Switching Using Tilting Micromirrors," Journal of Lightwave Technology, vol. 17, No. 5 (May 1999).

Frejlich, Jamie et al. "Analysis of an Active Stabliziation System for a Holographic Setup," Applied Optics, May 15, 1988, vol. 27, No. 10, pp. 1967-1976.

Goodman, Joseph W. "Introduction to Fourier Optics," 1968, pp. 198-224.

Havermeyer, Frank et al. "Volume Holographic Grating-Based Continuously Tunable Optical Filter," Opt. Eng. 43(9), Sep. 2004, pp. 2017-2021.

Heaney et al., "Sol-gel derived photosensitive germanosilicate glass monoliths," Opt. Lett., vol. 25(24), pp. 1765-1767 (Dec. 2000).

Hill, "Photosensitivity in optical fiber waveguides: Application to reflection filter fabrication," Appl. Opt. Lett. vol. 32(10), pp. 647-649 (1978).

Hill, "Simple Transient Holograms in Ruby," Appl. Opt., vol. 10(7), pp. 1695-1697 (1971).

In re Rose, 220 F.2d 459, 105 USPQ 237-241 (CCPA 1955).

Kogelnik, Herwig. "Coupled Wave Theory for Thick Hologram Gratings," The Bell System Tech. Journal, Nov. 1969, vol. 48, No. 9, pp. 2909-2947.

Levene, Michael et al. "Method for Controlling the Shift Invairance of Optical Correlators," Applied Optics, Jan. 10, 1999, vol. 38, No. 2, pp. 394-398.

Li, Lijun et al. "Experimental Studies on Narrow-Linewidth YB3+-Doped Double-Clad Fiber-Laser Cavities Based on Double-Clad Fiber Bragg Gratings," Microwave and Optical Technology Letters, 44(1):53-56 (2005).

Littman, Michael G. "Singlemode Operation Grazing-Incidence Pulsed Dye Laser," Optics Letters, Oct. 1978, vol. 3, pp. 138-140.

Mill, P. "Single Mode Operation of a 1.55 Micrometer Semi-conductor Lasers Using a Volume Holographic Grating," Jul. 1985, Electronics Letters.

Mitchard, Gordon et al. "Double-Clad Fibers Enable Lasers to Handle High Power," Laser Focus World. Jan. 1999.

Miyazaki, T. et al. "Nd-Doped Double-Clad Fiber Amplifier at 1.06um," Journal of Lightwave Technology, 16(4): 562-566 (Apr. 1998).

Moser, Christophe. "Folded Shift Multiplexing," Optics Letters, vol. 28 (11) (Jun. 2003).

Sadot, D. et al. "Tunable Optical Filters for Dense WDM Networks," IEEE Communications Magazine, 50-55 (1998).

Saleh, B. and M. Teich, "Fundamentals of Photonics," Wiley-Interscience, p. 151, 631-632 (1991).

Smith, Warren. "Modern Optical Engineering," 1990, pp. 43-47.

Steckman, Gregory J. et al. "Holographic Data Storage in Phenanthrenequinone Doped PMMA," SPIE Photonics West, San Jose, CA (Jan. 27, 1999).

Steckman, Gregory J. et al. "Holographic Multiplexing in Photorefractive Polymers," Optics Communications, Nov. 1, 2000, 185, pp. 13-17.

Steckman, Gregory J. et al. "Storage Density of Shift-Multiplexed Holographic Memory," Applied Optics, Jul. 10, 2001, vol. 40, No. 20, pp. 3387-3394.

Venus, George et al. "Semiconductor 1.7 W Volume Bragg Laser with Divergence Close to a Diffraction Limit," 26th Annual Conference on Lasers and Electro-Optics. CLEO/IQES and PhAST Technical Digest, Paper Code CFG4, Long Beach, CA, May 2006.

Volodin, B.L. et al. "Wavelength Stabilization and Spectrum Narrowing of High-Power Multimode Laser Diodes and Arrays by Use of Volume Bragg Gratings," Optics Letters, vol. 29, No. 16 (Aug. 15, 2004).

Yiou, Silvie et al. "Improvement of the Spatial Beam Quality of Laser Sources with an Intracavity Bragg Grating," Opt. Lett, 28 (4), 242 (2003).

Zorabedian, Paul. "Tunable Lasers Handbook—tunable external-davity semi-conductor lasers," Chapter 8, Academic Press (1995).

Bosomworth et al. "Thick holograms in photochromic material" Applied Optics [Online] 1968, 7(1), Abstract.

Erdei et al. "Optimization method for the design of beam shaping systems" Optical Engineering [Online] 2002, 41, Abstract.

Shu et al. "More on analyzing the reflection of a laser beam by a deformed highly reflective Volume Bragg grating using iteration of the beam propagation method" Applied Optics [Online] 2009, 48 (1) , pp. 22-27.

"More on analyzing the reflection of a laser beam by a deformed highly reflective Volume Bragg grating using iteration of the beam propagation method," Shu, Hong et al. Applied Optics, vol. 48, No. 1 (Jan. 1, 2009).

Shu, Hong et al., "More on analyzing the reflection of a laser beam by a deformed highly reflective Volume Bragg grating using iteration of the beam propagation method," Applied Optics, vol. 48, No. 1 (Jan. 1, 2009).

* cited by examiner

CORRECTING SPATIAL BEAM DEFORMATION

CROSS-REFERENCE TO RELATED APPLICATIONS

This patent application is a continuation and claims the priority benefit of U.S. patent application Ser. No. 12/460,060 filed Jul. 13, 2009, now U.S. Pat. No. 8,369,017, issued Feb. 5, 2013, and entitled "Optical Pulse Shaping Method and Apparatus," which claims the priority benefit of U.S. provisional patent application No. 61/197,458 filed Oct. 27, 2008, the aforementioned disclosures being incorporated herein by reference in its entirety.

BACKGROUND OF THE INVENTION

1. Field of the Invention

The present invention relates to a method and apparatus for altering the temporal and spatial shape of an optical pulse. Pulse stretchers based on volume holographic chirped reflection gratings (VHCRG) are used for increasing the temporal length of an optical pulse prior to amplification by an optical amplifier. After amplification, the optical pulse is temporally recompressed by a pulse compressor in order to achieve a short duration pulse. During the process of stretching and compressing, the spatial shape of the pulse can be distorted by the volume grating. It is desirable to obtain a mean to produce a beam spatial profile that is clean, i.e. free of spatial distortion after the stretching and compression steps by diffraction from a chirped reflecting volume holographic grating.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

FIG. 1 illustrates a state-of-the-art pulse stretcher/compressor pair that produces a high power short pulse. A seed oscillator optical pulse 100 is collimated and directed to a pulse stretcher comprised of two dispersive diffraction gratings 110 and a pair of lenses positioned in between. The diffraction gratings 110 are placed one focal length away from the lenses. The stretched pulse 120 is amplified by an optical amplifier 130, whose output produces a high power stretched pulse 140. The high power long pulse is shortened by a compressor that uses two dispersive diffraction gratings 150. The output of the compressor is a short and intense pulse 160.

The compressor/stretcher based on dispersive grating are bulky due to the small angular dispersion that can be achieved. In contrast, a pulse stretcher/compressor based on non-dispersive volume holographic chirped reflection gratings (VHCRG) is several times smaller. FIG. 2 illustrates the concept. A seed oscillator optical pulse 200 is collimated and directed to a pulse stretcher that is comprised of a VHCRG. The input aperture is typically several square millimeters. The VHCRG can be made out of different thick holographic materials such as photo-thermal glass (PTR) or crystals which have a high peak power damage threshold. Commercial PTR VHCRG typically have several hundreds of MW/cm² damage threshold for 20 ns pulses at 20 Hz repetition rate near 1 µm. FIG. 3 illustrates a damage threshold measurement for commercial PTR volume holographic material.

In PTR holographic glass, a small DC index change arises between the top and bottom of the VHCRG. Absorption of the recording beam during the recording process creates an uneven exposure in the direction of the recording beam throughout the thickness of the material. In holographic photo-thermo refractive glass for example, this exposure change creates a small DC index change of the order of $10^{-4}$.

The DC index change is related to the illumination exposure and thus along the thickness of the sample, the DC index change varies continuously. The DC index gradient affects the propagation of a collimated beam. FIG. 4 illustrates this effect. An undistorted collimated beam 400 with a beam size of the order of the thickness of the VHCRG 410 will be diffracted into beam 420 in the direction of the DC index gradient thus deforming the spatial profile of the incident beam. The output beam profile 430 is shown in FIG. 4. The extent of the angular deflection can be approximated by the following formula: $\alpha \approx (\partial n/\partial z) L/n$, where a is the deflection angle, $(\partial n/\partial z)$ the index of refraction gradient, L the length of the VHCRG and n its average index of refraction. For example, the expected deflection angle in the case of an index gradient of $10^{-4}$/mm, length L of 30 mm and average index of 1.5 yields a deflection angle of 2 mrad. Because the diffracted beam propagates twice the length L of the VHCRG (by reflection), the total deflection angle becomes 4 mrad. After a free space propagation of only 25 cm, a 1 mm diameter pulse diffracted by the VHCRG will be elongated in one direction (the direction of the DC index gradient) by 1 mm. The extent of the oblong spatial beam profile of the diffracted beam 420 matches the above quantitative explanation. Although small, the effect on the spatial beam profile is detrimental for proper amplification of the stretched pulse. It is also detrimental when the recompressed pulse needs to be close to distortion free for applications such as but not limited to thin film photovoltaic scribing, precise machining and ablation.

In order to increase the time delay, while maintaining the same length VHCRG, a double pass configuration with a VHCRG is used. FIG. 5 illustrates the method. A seed oscillator optical pulse 500 is collimated and directed to a pulse stretcher that is comprised of a VHCRG 510 and a flat mirror 520. The angular positioning of the mirror is such that the diffracted beam is reflected and counter propagating. The double pass in the VHCRG 510 increases the time delay by a factor 2 with respect to the single pass configuration illustrated in FIG. 2. However, the beam distortion is amplified by a factor 2 as well. FIG. 6 illustrates this effect. The incident beam is diffracted by the VHCRG 600 and reflected by a flat mirror 610 to produce a counter-propagating beam which is in turn re-diffracted by the VHCRG 600 to produce beam 620. At each diffraction, the deflection increase towards the DC index gradient.

SUMMARY OF THE INVENTION

A method is proposed to correct for the spatial beam deformation caused by the intrinsic DC index gradient in a VHCRG.

The second set of methods involves a mechanical mean of pre-deforming the VHCRG so that the combination of the deflection caused by the DC index gradient is compensated by the mechanical deformation of the VHCRG. The first set of methods involves compensating the angular deflection caused by the DC index gradient by retracing the diffracted beam back onto itself and by re-diffracting from the same VHCRG. Apparatus for temporally stretching, amplifying and temporally compressing light pulses are disclosed that rely on the methods above.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

In the following description of the present invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
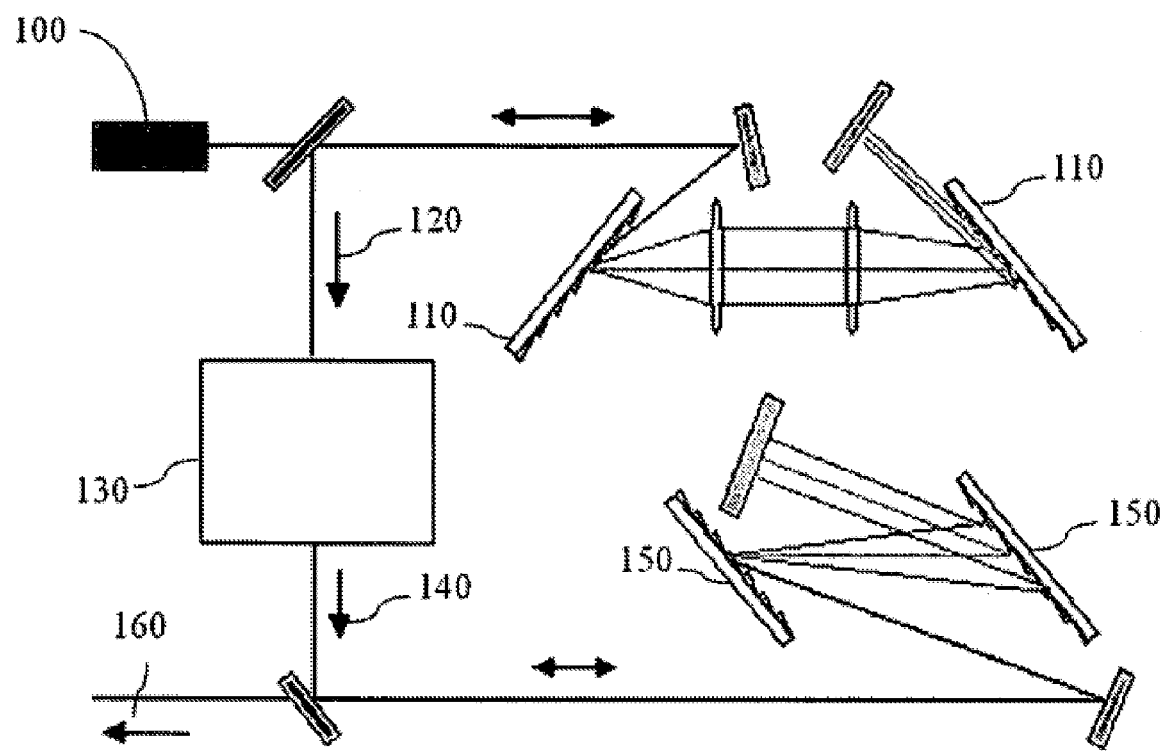
FIG. 1 (prior art): pulse stretcher/compressor with dispersive diffraction grating.
Figure 2:
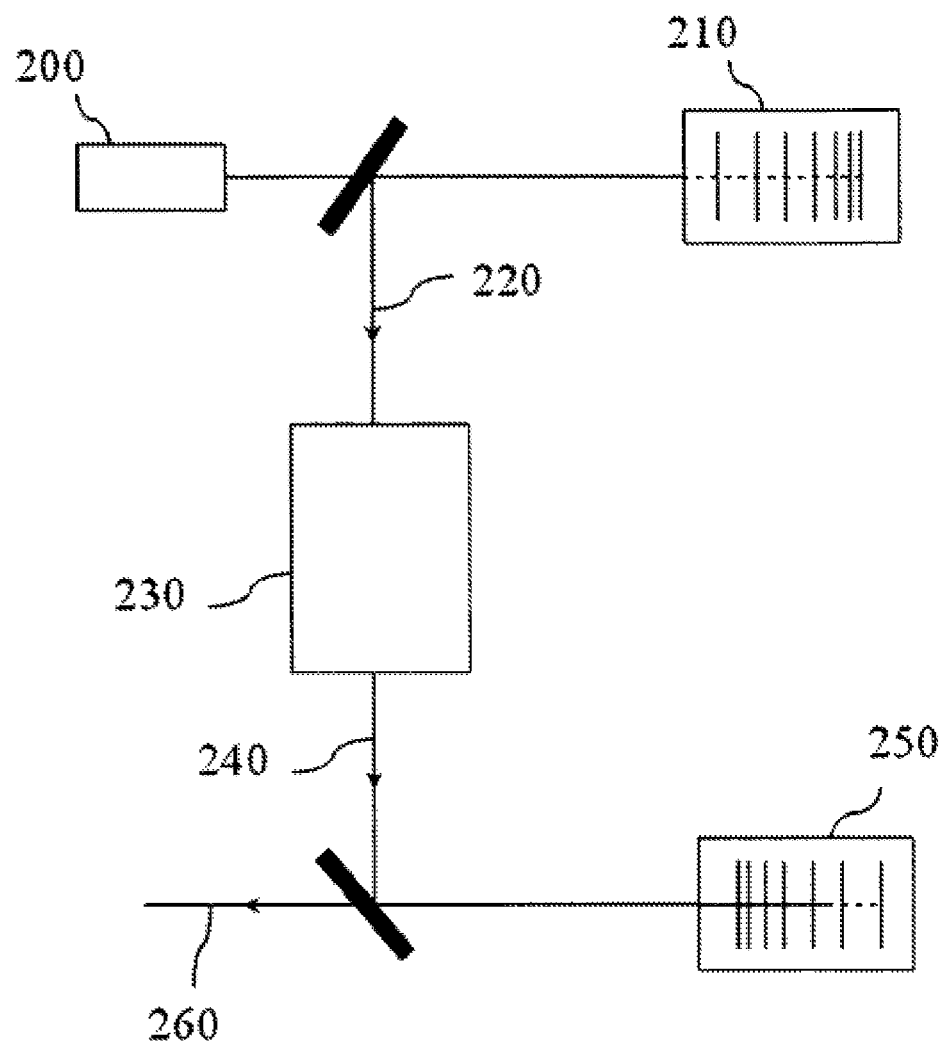
FIG. 2 (prior art): pulse stretcher/compressor with non-dispersive volume holographic chirped reflective grating (VHCRG).
Figure 3:
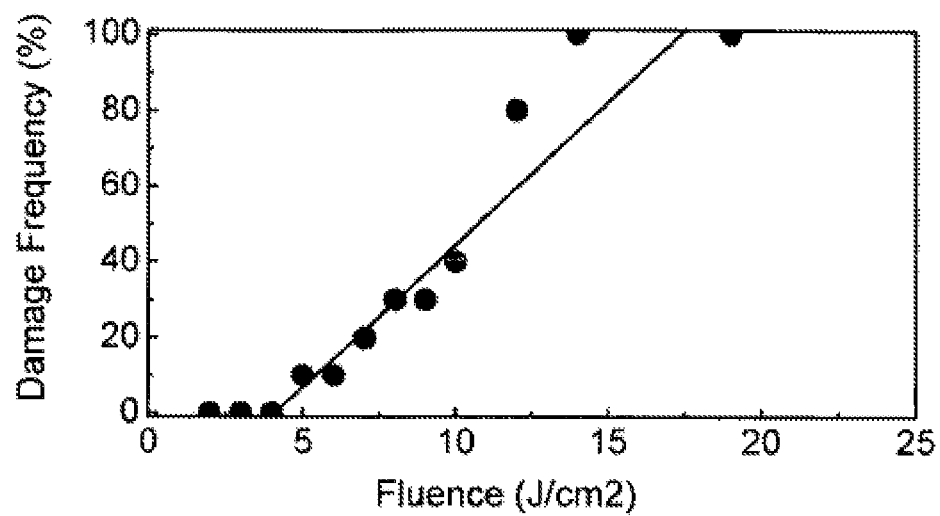
FIG. 3 (prior art): damage threshold measurement for a volume holographic photo-thermal glass.
Figure 4:
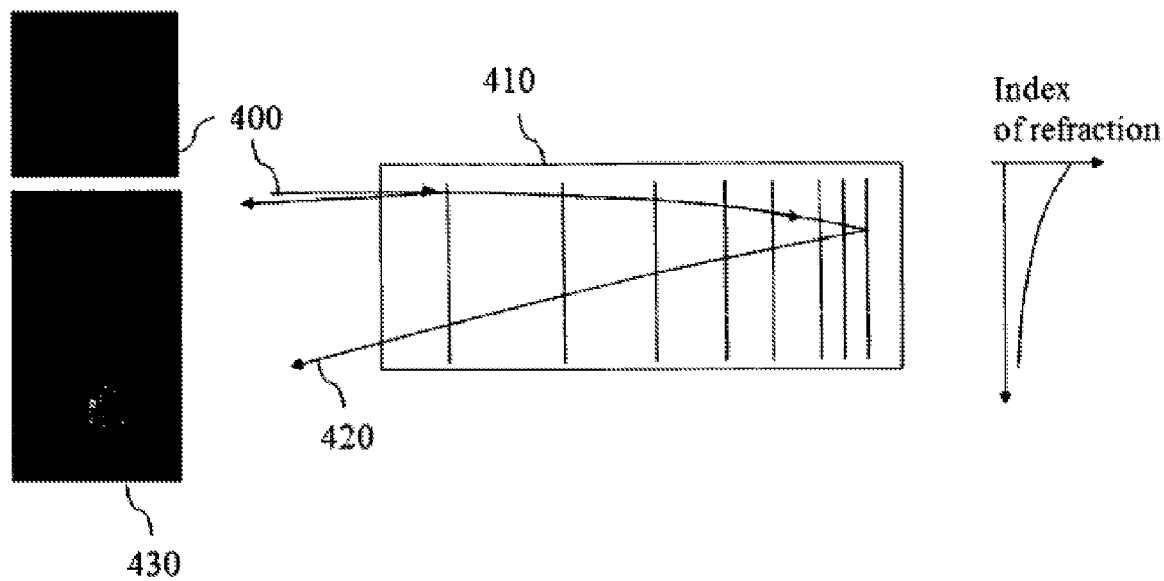
FIG. 4 (prior art): illustration of the spatial beam distortion created by a DC gradient index in a photo-thermal volume holographic chirped reflective grating (VHCRG).
Figure 5:
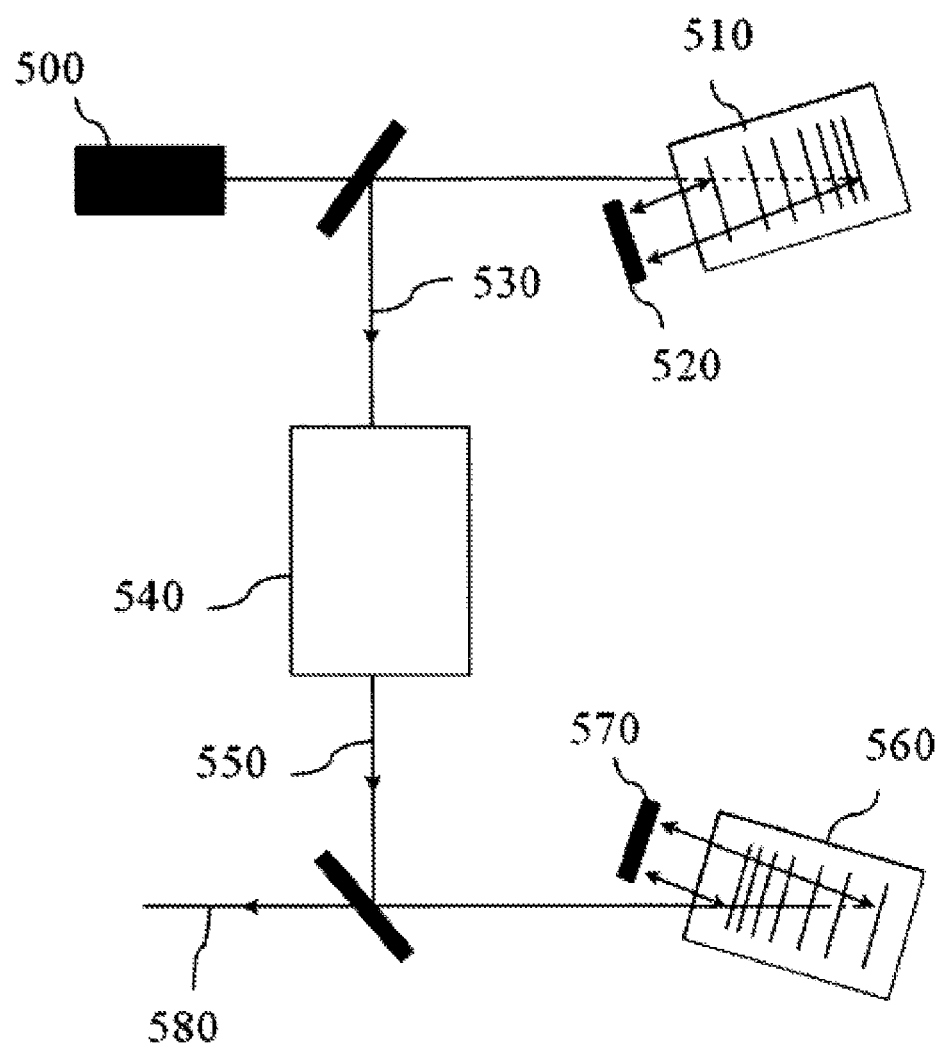
FIG. 5 (prior art): pulse stretcher/compressor with non-dispersive volume holographic chirped reflective grating (VHCRG) with double pass arrangement.
Figure 6:
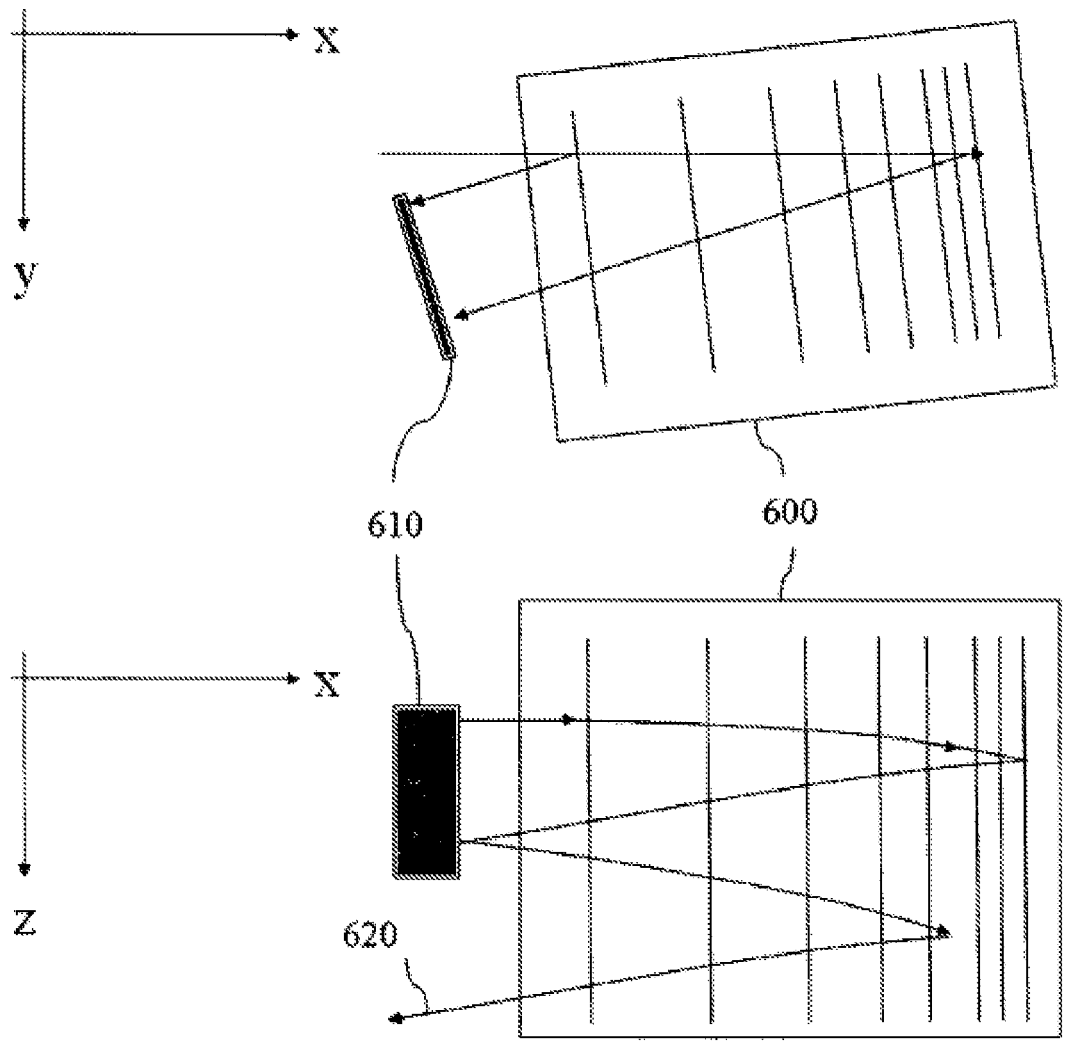
FIG. 6 (prior art): details of the double pass arrangement of FIG. 5.
Figure 7:
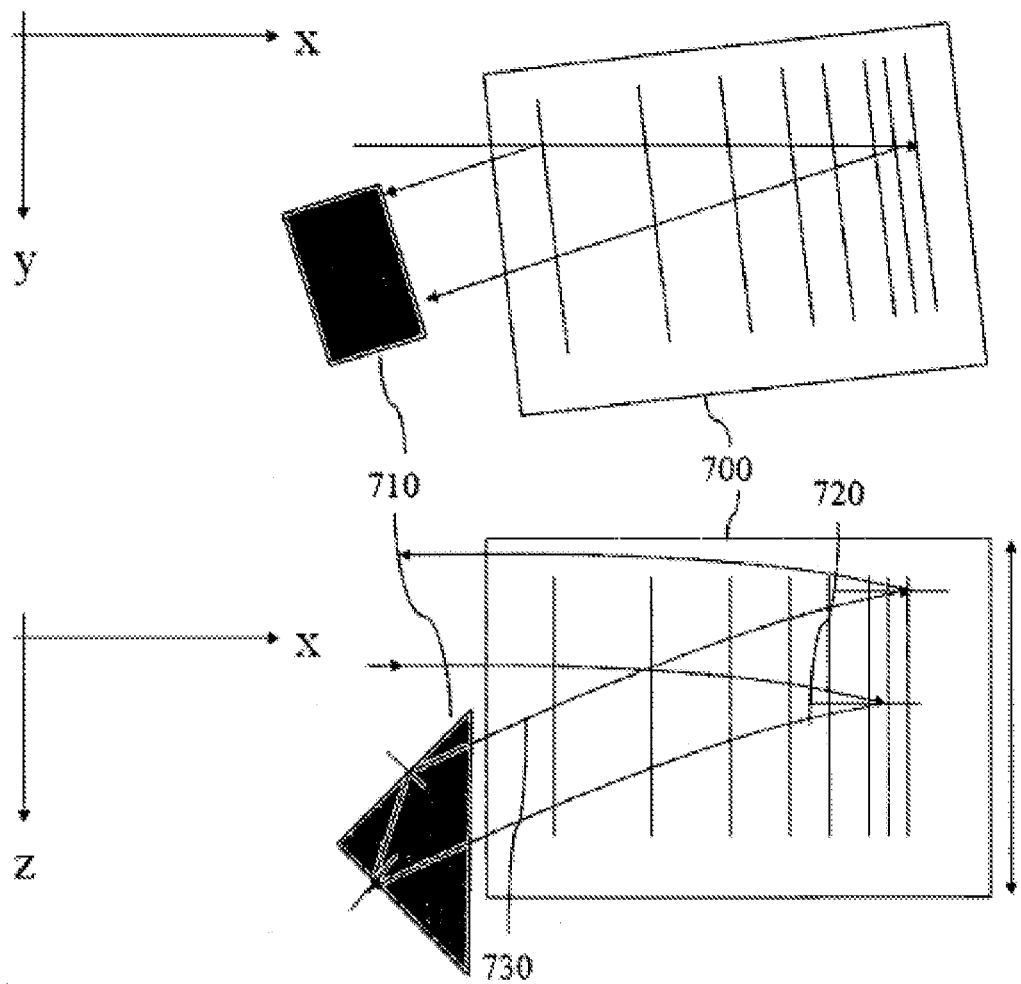
FIG. 7: illustration of a compensated double pass arrangement with VHCRG to provide a distortion free diffracted beam.

FIG. 7 illustrates the method. A right angle mirror or right angle prism 710 replaces the flat mirror found in FIG. 6. The right angle mirror or right angle prism 710 retraces the diffracted beam 720 back onto itself to produce beam 730. During the first diffraction by the VHCRG 700, the beam is no longer collimated in the direction of the DC gradient. However, because the right angle mirror or right angle prism 710 reflects the diffracted beam 720 back onto itself irrespective of the collimation in the direction of the gradient index, the second diffraction recollimates the beam to provide an undistorted beam profile.

Figure 8:
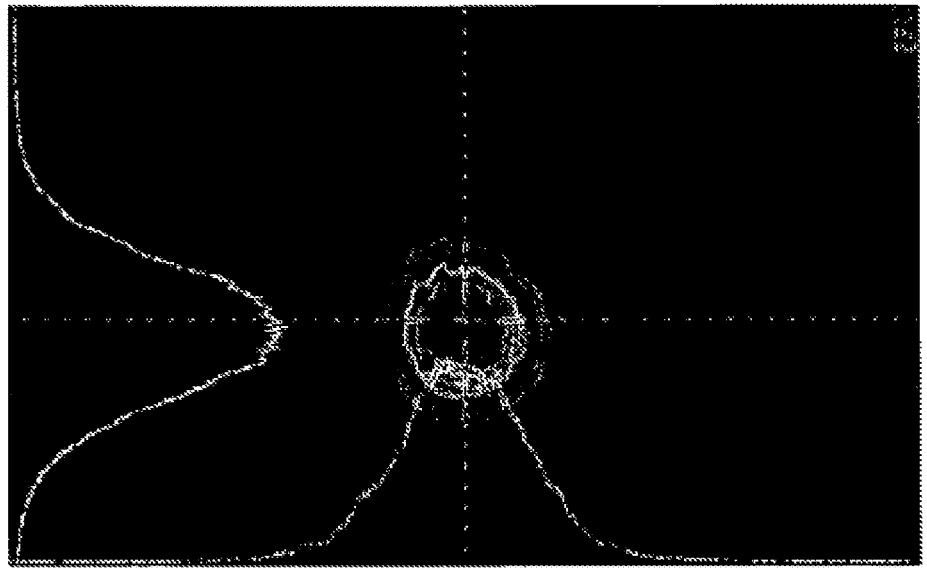
FIG. 8: beam profile measurement of the diffracted beam using the method of FIG. 7.

FIG. 8 shows the spatial profile resulting from using the method of FIG. 7. For the compressor, the orientation of the VHCRG is reversed with respect to input beam. The same right angle mirror or prism arrangement is used.

Figure 9:
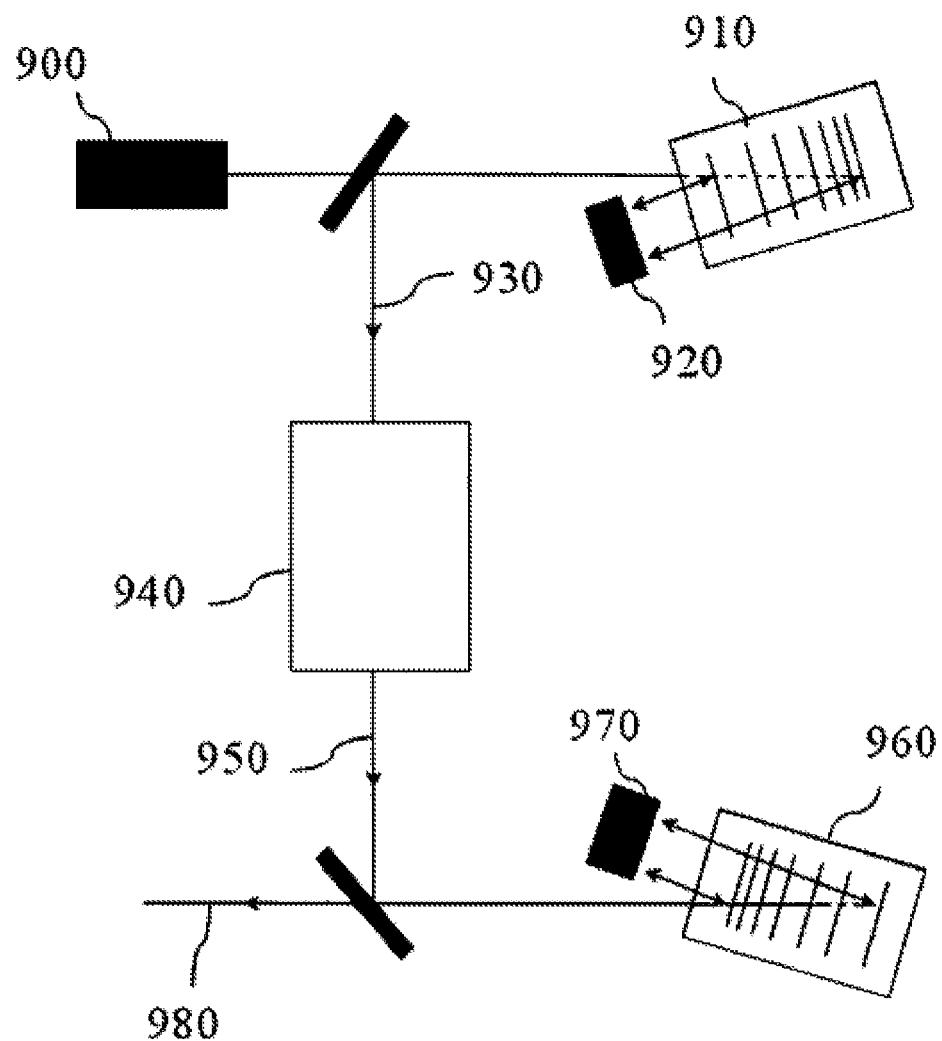
FIG. 9: pulse stretcher/compressor apparatus with non-dispersive volume holographic chirped reflective grating (VHCRG) with double pass arrangement method of FIG. 7.

Another embodiment in the invention is the apparatus of FIG. 9 which is uses the embodiment above illustrated in FIG. 7 to provide a spatially clean beam after temporally stretching, amplifying and re-compressing the pulse.

A seed oscillator optical pulse 900 is collimated and directed to a pulse stretcher that is comprised of a VHCRG 910 and a right angle prism or right angle mirror 920. The distortion-free temporally stretched pulse 930 is amplified by an optical amplifier medium 940 which can be, but not restricted to a fiber amplifier or a free space amplifier. The amplified beam 950 is fed into a pulse compressor that is comprised of a VHCRG 960 and a right angle prism or right angle mirror 920. The VHCRG 960 is a stretcher used in reverse i.e. the chirp direction is reversed. A right angle prism or right angle mirror 970 is used as well to correct for the spatial distortion. This can be realized for example by cutting a VHCRG in two pieces and using one piece as a stretcher and the other as a compressor. The imperfection in the fabrication of the VHCRG stretcher such as the non-linearity of the chirp rate or chirp amplitude can then be corrected by the compressor with near identical imperfections. Beam 980 is a high power short pulse after temporal compression by the VHCRG compressor.

Figure 10:
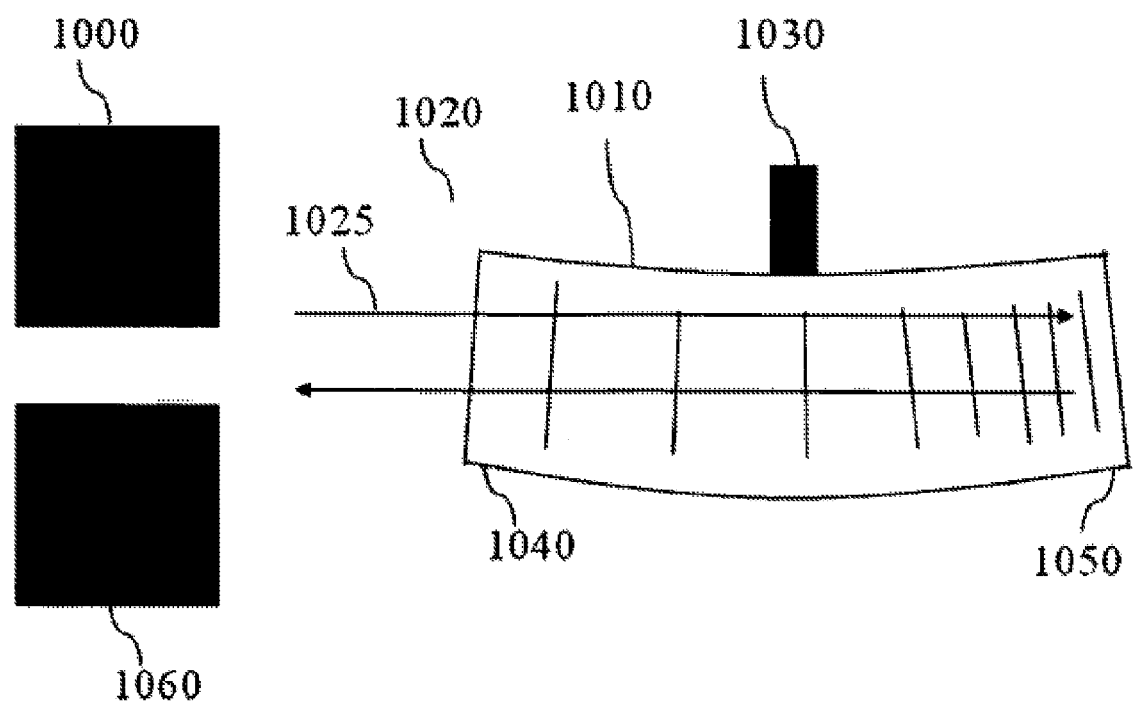
FIG. 10: illustration of a mechanical mean to pre-distort the VHCRG to provide a distortion free diffracted beam.
Figure 11:
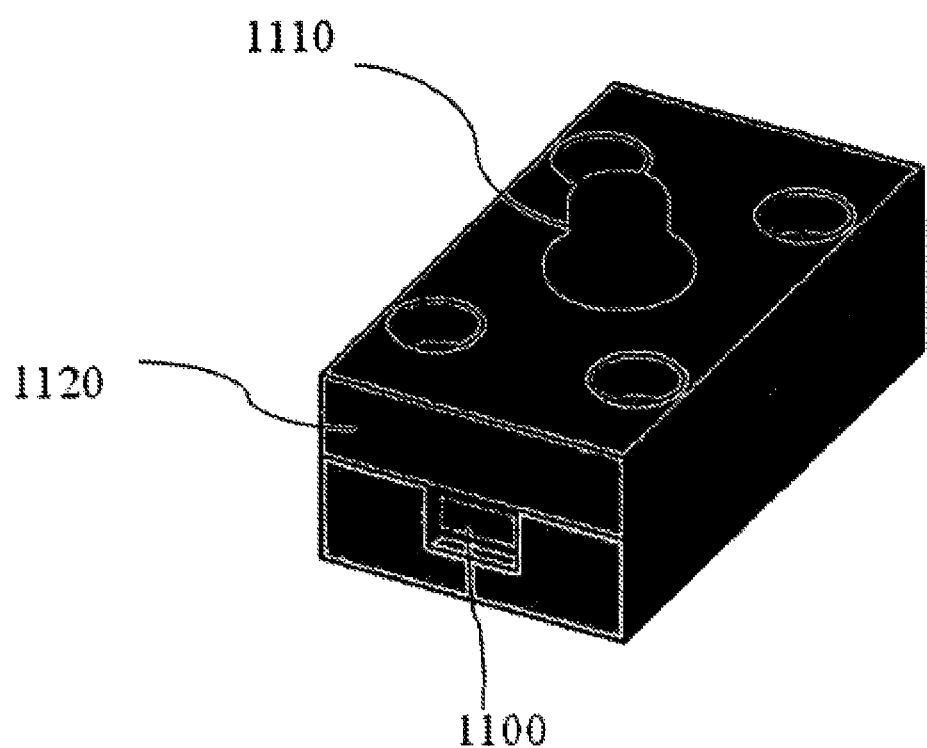
FIG. 11: three-dimensional rendition of the illustration in FIG. 10.
Figure 12:
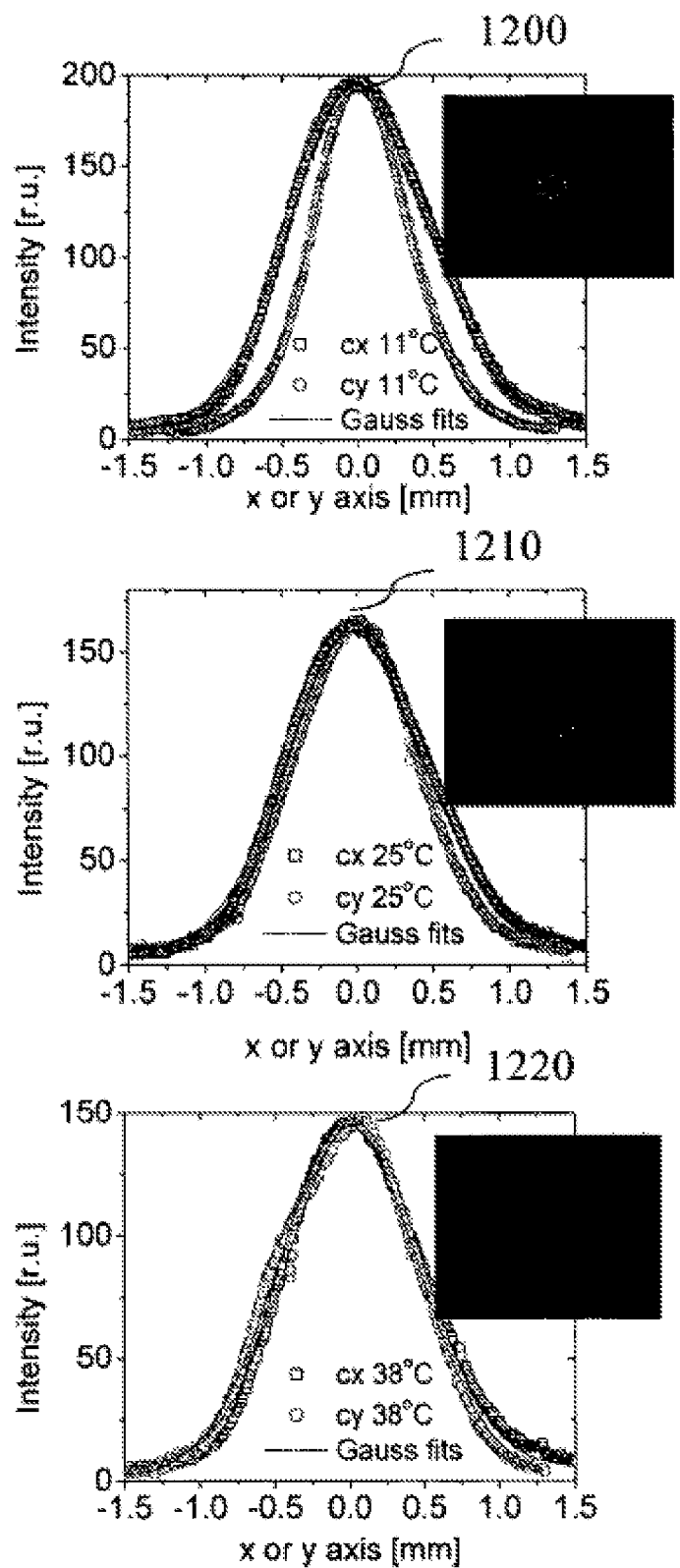
FIG. 12: Temperature dependence of the beam profile using the package of FIG. 10.
Figure 13:
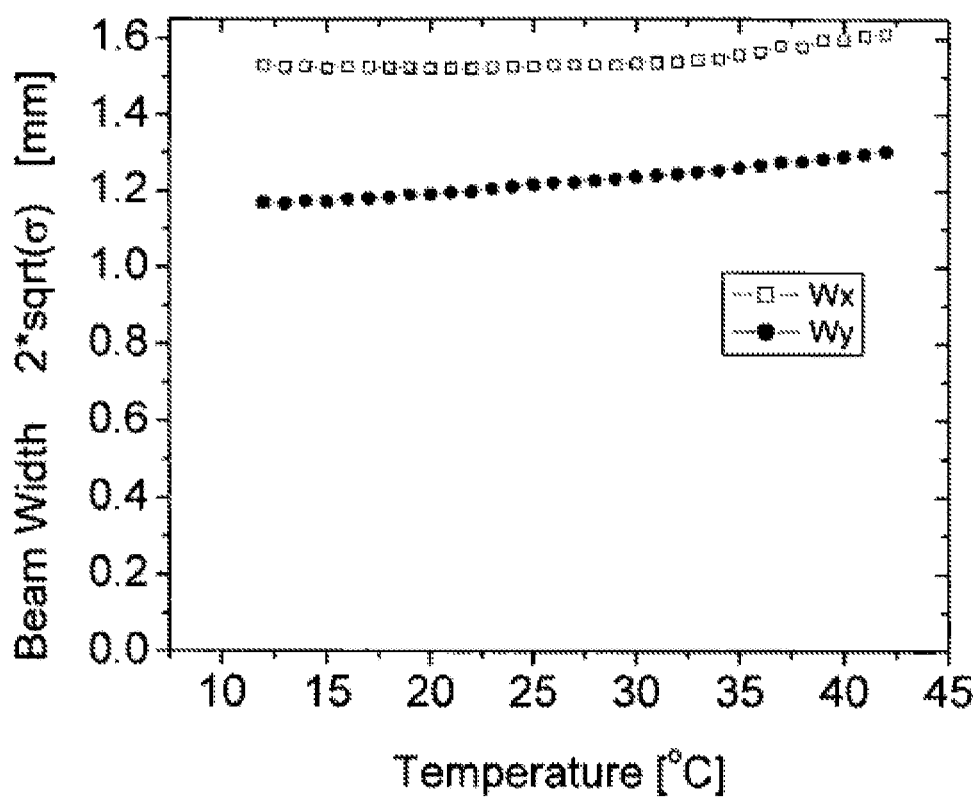
FIG. 13: detailed measurement of the beam profile at fine temperature increment using the package of FIG. 10.
Figure 14:
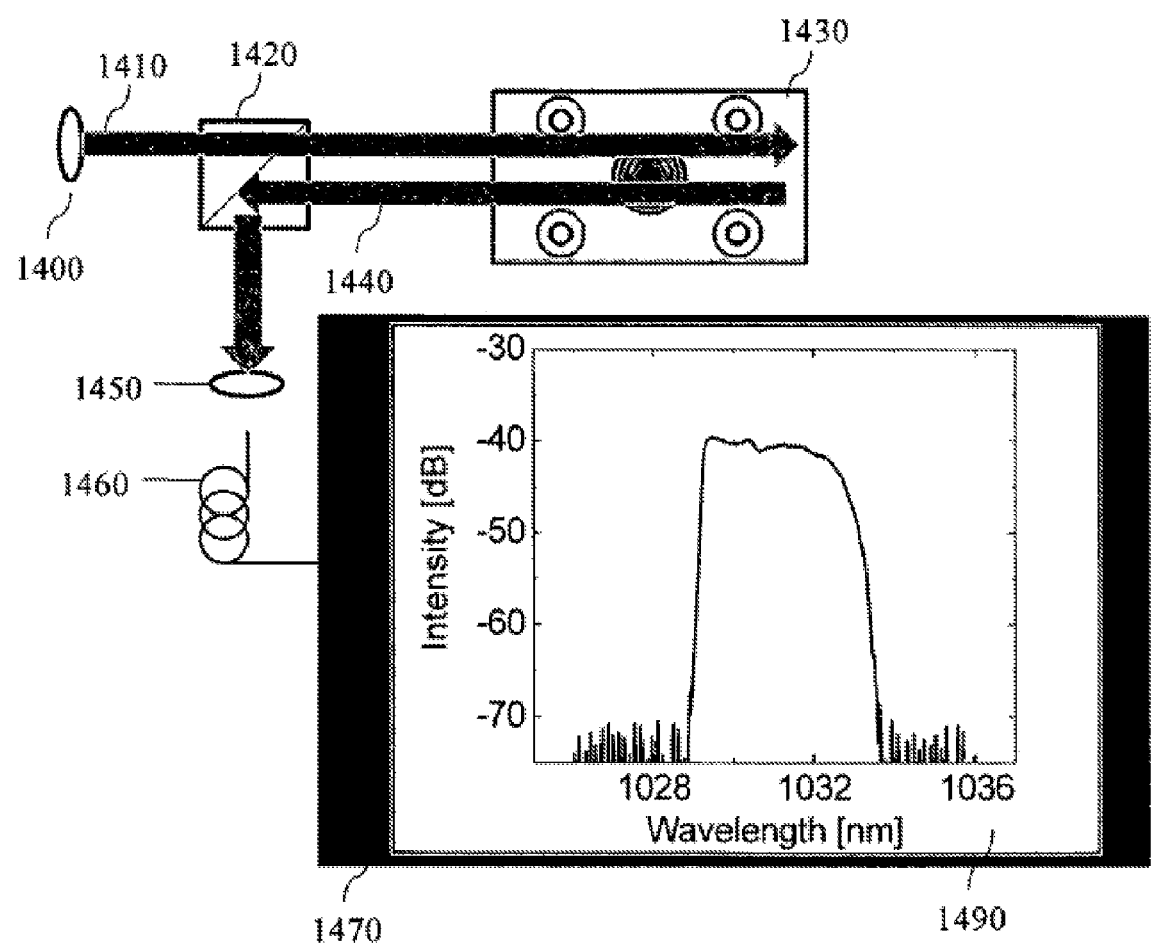
FIG. 14: Spectral measurement of the VHCRG.

In another embodiment, a VHCRG 1010 is mechanically deformed by applying pressure on one or more points while the edges of the entrance and exit facets 1040 and 1050 of the VHCRG 1010 respectively are resting on a mount 1020. In general, any mechanical apparatus that provides bending in a direction approximately orthogonal to the incident light direction 1025 and in the direction of the gradient can be used. FIG. 10 shows an example only. A screw 1030 provides an adjustable mean for varying the pressure on the VHCRG and thus the amount of bending. The dimension of the mount 1020 may vary with the cross section and length of the VHCRG 1010. In general, consideration must be adequately taken to provide enough stiffness in the mount to enable bending the VHCRG. Experimentally, the incident distortion-free beam profile 1000 is diffracted by the VHCRG to produce a distortion-free stretched beam 1060. Due to the symmetry of the device, the compressor also produces a distortion-free beam. A three-dimensional rendition of the mount realized with the VHCRG 1100 in a mount 1120. A screw 1110 positioned approximately, but not restricted to, the middle of the mount 1120, can adjust the amount of stress (bending) applied to the VHCRG 1100. The packaged VHCRG of FIG. 11 has been tested a different temperature. The beam quality a three temperature, 11° C. (1200), 25° C. (1210) and 38° C. (1220) is shown respectively in FIG. 12. FIG. 13 shows more detailed measurement of the spatial beam width in two axis at finer temperature increments. The good beam quality of the temporally stretched, compressed beam using the packaged VHCRG of FIG. 11 is also demonstrated in FIG. 14. A lens 1400 collimates the output of a single mode fiber (not shown). The light source is a wide spectral band source (40 nm FWHM). The collimated beam 1410 is diffracted by the packaged VHCRG 1430. The diffracted beam 1440 has a spectral width which is equal to the spectral width of the VHCRG. A beam splitter 1420 picks off the diffracted beam 1440 and redirects it to a lens 1450 which focuses the light into a single mode fiber 1460. The output of the fiber 1460 is fed into a spectrometer 1470. The spectrum 1490 of the diffracted beam matches the spectral bandwidth of the VHCRG. The achieved coupling efficiency of 70% proves that the beam quality is near distortion-free.

Figure 15:
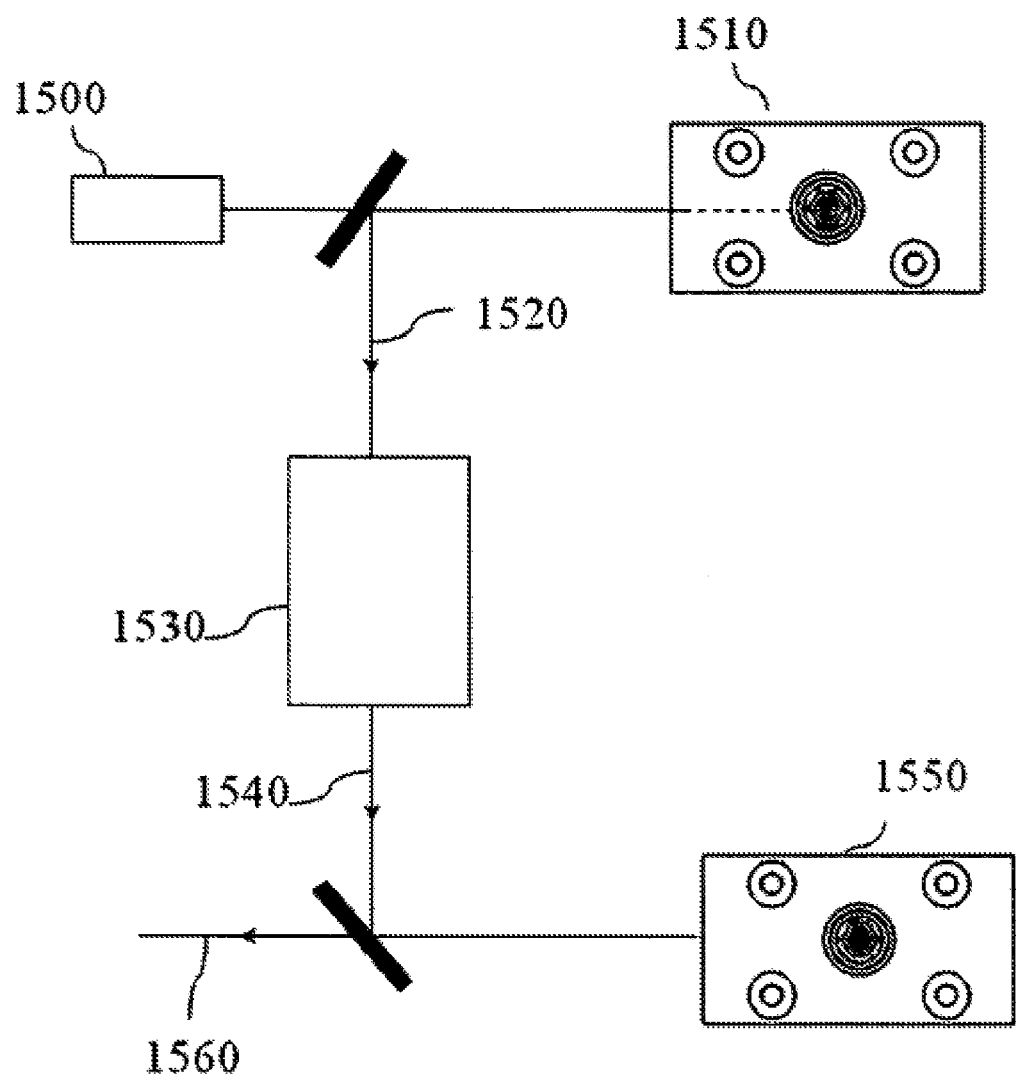
FIG. 15: illustration of an apparatus with uniform beam profile after pulse stretcher/amplification/compressor with two VHCRGs packaged according to FIG. 11.
Figure 16:
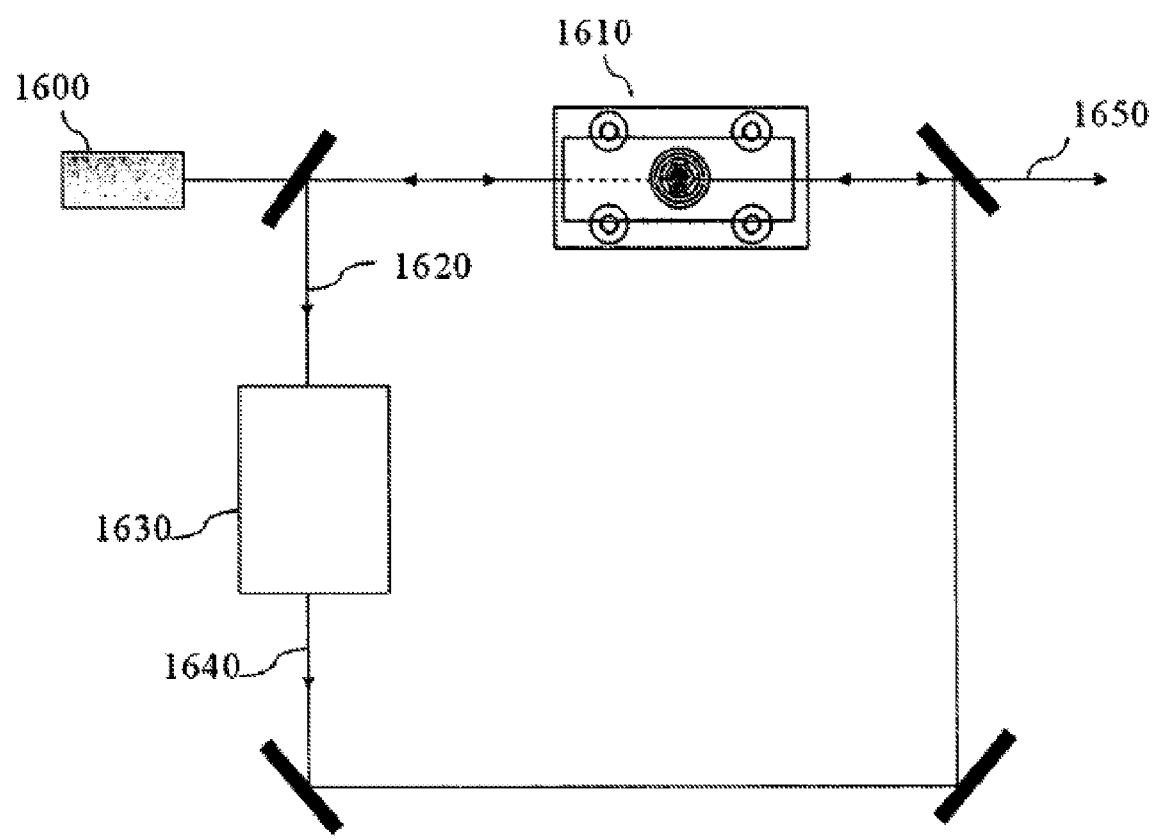
FIG. 16: illustration of an apparatus with uniform beam profile after pulse stretcher/amplification/compressor with a single VHCRG packaged according to FIG. 11.

Another embodiment in the invention is the apparatus of FIG. 15 which is uses the embodiment above illustrated in FIG. 10-14 to provide a spatially distortion-free beam after temporally stretching, amplifying and temporally re-compressing a pulse. A seed oscillator optical pulse 1500 is collimated and directed to a pulse stretcher that is comprised of a packaged VHCRG 1510 according to embodiments disclosed in FIGS. 10 and 11. The distortion-free temporally stretched pulse 1520 is amplified by an optical amplifier medium 1530 which can be, but not restricted to a fiber amplifier or a free space amplifier. The amplified beam 1540 is fed into a pulse compressor that is comprised of a packaged VHCRG 1550, according to embodiments disclosed in FIGS. 10 and 11. The packaged VHCRG 1550 is a stretcher used in reverse i.e. the chirp direction is reversed with respect to the stretcher. This can be realized for example by cutting a VHCRG in two pieces and using one piece as a stretcher and the other as a compressor. The imperfection in the fabrication of the VHCRG stretcher such as the non-linearity of the chirp rate or chirp amplitude can then be corrected by the compressor with near identical imperfections. Beam 1560 is a high power short pulse after temporal compression by the VHCRG compressor.

In yet another embodiment, A seed oscillator optical pulse 1600 is collimated and directed to a pulse stretcher that is comprised of a packaged VHCRG 1610 according to embodiments disclosed in FIGS. 10 and 11. The distortion-free temporally stretched pulse 1620 is amplified by an optical amplifier medium 1630 which can be, but not restricted to a fiber amplifier or a free space amplifier. The amplified beam 1640 is directed by a set of mirrors towards the opposite facet of the same VHCRG 1610. The temporally stretched beam 1640 is temporally compressed by the VHCRG 1610 to produce a high power short pulse beam 1650.

In all the embodiments above, the optical radiation whose temporal and spatial profile is altered can be produced, but not limited to, a semi-conductor laser, a solid state laser, a fiber laser in the range of 266 nm to 2.5 micrometers.

What is claimed is:

1. A method for correcting spatial beam deformation comprising:
    resting a volume holographic chirped reflective grating on a mount;
    receiving an optical beam propagated in free space and directed at the volume holographic chirped reflective grating, the optical beam being temporally stretched, the volume holographic chirped reflective grating causing spatial beam deformation of the optical beam; and
    applying mechanical pressure to the mounted volume holographic chirped reflective grating, the mechanical pressure being applied approximately from a middle of the mount and causing a bending of the volume holographic chirped reflective grating, the bending being in a direction approximately orthogonal to the optical beam and correcting the spatial beam deformation of the optical beam.

2. The method of claim 1, further comprising adjusting the mechanical pressure applied to the mounted volume holographic chirped grating, the adjustment of the mechanical pressure corresponding to an amount of bending.

3. The method of claim 1, further comprising testing the volume holographic chirped reflective grating by measuring quality of the optical beam diffracted by the volume holographic chirped reflective grating over a range of temperatures.

4. The method of claim 1, wherein the volume holographic chirped grating comprises photo thermal glass and the mechanical pressure is applied using thermal binding.

5. An apparatus for correcting spatial beam deformation comprising:
    a mount for holding a volume holographic chirped reflective grating, the volume holographic chirped reflective grating having an entrance facet and an exit facet, the entrance and exit facets each having an edge, the edges of the entrance and exit facets resting on the mount, wherein an optical beam propagated in free space and directed at the volume holographic chirped reflective grating is temporally stretched and wherein the volume holographic chirped reflective grating is determined to cause spatial beam deformation of the optical beam; and
    a structure, the structure applying mechanical pressure to the mounted volume holographic chirped reflective grating, the mechanical pressure causing a bending of the volume holographic chirped reflective grating such that the bending is in a direction approximately orthogonal to the optical beam and corrects the spatial beam deformation of the optical beam.

6. The apparatus of claim 5, wherein the structure applying mechanical pressure is further used to adjust the mechanical pressure applied to the mounted volume holographic chirped grating, the adjustment of the mechanical pressure corresponding to an amount of bending.

7. The apparatus of claim 5, further comprising:
    an amplifier, the amplifier increasing power of the corrected optical beam to produce an amplified optical beam; and
    a compressor, the compressor temporally compressing the amplified optical beam, the compressor including a second volume holographic chirped reflective grating under a same amount of mechanical pressure as the volume holographic chirped reflective grating.

8. The apparatus of claim 7, wherein the second volume holographic chirped reflective grating is fabricated from a common piece as the volume holographic chirped reflective grating.

* * * * *